US009430029B2

(12) United States Patent
Alpert et al.

(10) Patent No.: US 9,430,029 B2
(45) Date of Patent: Aug. 30, 2016

(54) SYSTEMS AND METHODS FOR LOW POWER PROCESSING BASED ON LOCATION INFORMATION

(71) Applicant: Intel Corporation, Santa Clara, CA (US)

(72) Inventors: Yaron Alpert, Hod Hasharoni (IL); Gil Zukerman, Hod-HaSharon (IL); Haim Rochberger, Tel Mond (IL); Ehud Reshef, Kiryat Tivon (IL); Tirosh Levin, Hadera (IL); Oz Micka, Kiryat-Ono (IL)

(73) Assignee: Intel Corporation, Santa Clara, CA (US)

(*) Notice: Subject to any disclaimer, the term of this patent is extended or adjusted under 35 U.S.C. 154(b) by 510 days.

(21) Appl. No.: 13/730,484

(22) Filed: Dec. 28, 2012

(65) Prior Publication Data

US 2013/0238921 A1     Sep. 12, 2013

Related U.S. Application Data

(60) Provisional application No. 61/608,865, filed on Mar. 9, 2012.

(51) Int. Cl.
*G06F 1/32* (2006.01)
*H04W 4/02* (2009.01)
(Continued)

(52) U.S. Cl.
CPC ........... *G06F 1/3246* (2013.01); *G06F 1/3206* (2013.01); *G06F 1/3287* (2013.01); *G06F 1/3293* (2013.01); *H04W 4/02* (2013.01); *H04W 52/0254* (2013.01); *H04M 1/72572* (2013.01); *Y02B 60/121* (2013.01); *Y02B 60/1282* (2013.01); *Y02B 60/50* (2013.01)

(58) Field of Classification Search
CPC .. G06F 1/3246; G06F 1/3206; G06F 1/3287; G06F 1/3293; H04M 1/72572; H04W 4/02; H04W 52/0254; Y02B 60/121; Y02B 60/1282; Y02B 60/50
See application file for complete search history.

(56) References Cited

U.S. PATENT DOCUMENTS

| 6,526,295 | B1 | 2/2003 | Shull |
| 7,925,298 | B2 * | 4/2011 | Chen et al. ................ 455/556.1 |
| 7,953,032 | B2 | 5/2011 | Liang |

(Continued)

FOREIGN PATENT DOCUMENTS

| CN | 101978748 A | 2/2011 |
| EP | 2293016 | 3/2011 |

(Continued)

OTHER PUBLICATIONS

International Search Report and Written Opinion received for PCT Application No. PCT/US2013/029619, mailed on Jun. 26, 2013, 12 pages.

(Continued)

*Primary Examiner* — M Elamin
(74) *Attorney, Agent, or Firm* — Sutherland Asbill & Brennan LLP

(57) ABSTRACT

Methods, systems, and computer-readable media are provided for offloading services and functionalities from a main host central processing unit (CPU) of a computing device to a dedicated power-efficient offload engine, thereby enabling a longer battery life for the device and an enhanced set of features.

22 Claims, 4 Drawing Sheets

(51) Int. Cl.
*H04W 52/02* (2009.01)
*H04M 1/725* (2006.01)

(56) References Cited

U.S. PATENT DOCUMENTS

| | | | |
|---|---|---|---|
| 8,046,617 | B2 | 10/2011 | Fleck et al. |
| 8,675,535 | B2* | 3/2014 | Finlow-Bates et al. ...... 370/311 |
| 8,706,172 | B2* | 4/2014 | Priyantha et al. ............ 455/574 |
| 2008/0168267 | A1 | 7/2008 | Bolen et al. |
| 2009/0164813 | A1 | 6/2009 | Tu et al. |
| 2009/0168267 | A1 | 7/2009 | Lin |
| 2009/0259865 | A1 | 10/2009 | Sheynblat et al. |
| 2010/0056181 | A1 | 3/2010 | Rippon et al. |
| 2010/0313050 | A1* | 12/2010 | Harrat et al. ................. 713/323 |
| 2011/0018346 | A1 | 1/2011 | Dixon |
| 2011/0250871 | A1 | 10/2011 | Huan et al. |
| 2012/0100895 | A1* | 4/2012 | Priyantha et al. ............ 455/574 |
| 2013/0244686 | A1* | 9/2013 | Saha et al. ................. 455/456.1 |

FOREIGN PATENT DOCUMENTS

| | | |
|---|---|---|
| JP | 2011-254367 | 12/2011 |
| KR | 20110086760 A | 7/2011 |
| WO | 2009/032753 | 3/2009 |
| WO | 2009032753 A1 | 3/2009 |
| WO | 2013/134507 A1 | 9/2013 |

OTHER PUBLICATIONS

International Preliminary Report on Patentability and Written Opinion received for PCT Patent Application No. PCT/US2013/029619, mailed on Sep. 18, 2014, 9 Pages.

Office Action from Korean Patent Application No. 2014-7025265 mailed Dec. 22, 2015. 7 pages. English Translation of Office Action, 7 pages.

Office Action from Japanese Patent Application 2014-561111 mailed Jul. 22, 2015. 3 pages Japanese Office Action. 2 Pages English Translation.

Extended European Search Report for European Application 13758636.8-1959 mailed Sep. 25, 2015. 9 Pages.

Chinese Office Action dated May 30, 2016 for Application No. CN 201380018728.0.

* cited by examiner

SYSTEMS AND METHODS FOR LOW POWER PROCESSING BASED ON LOCATION INFORMATION

CROSS-REFERENCE TO RELATED APPLICATION

The present application claims benefit of U.S. Provisional Application No. 61/608,865, filed Mar. 9, 2012, and entitled "Location Offloading," the disclosure of which is incorporated herein by reference in its entirety.

TECHNICAL FIELD

Embodiments of the disclosure relate generally to power saving techniques associated with the offloading of processing of device services and functionality to a component with lower power consumption, and more particularly to the offloading of location-based services and functionality.

BACKGROUND

With the expansion in the use and functionality of mobile computing devices, the demand for solutions that reduce the power consumption of such devices has increased as well. The expansion in the number and complexity of applications running on mobile computing devices has led to an increased demand for processing resources by such applications. In particular, applications that provide continuous location, location-based triggering, and context aware computing functionalities require significant processor resources to request, receive, and process data, and consequently, lead to increased power consumption and lower battery life.

DETAILED DESCRIPTION

Figure 1:
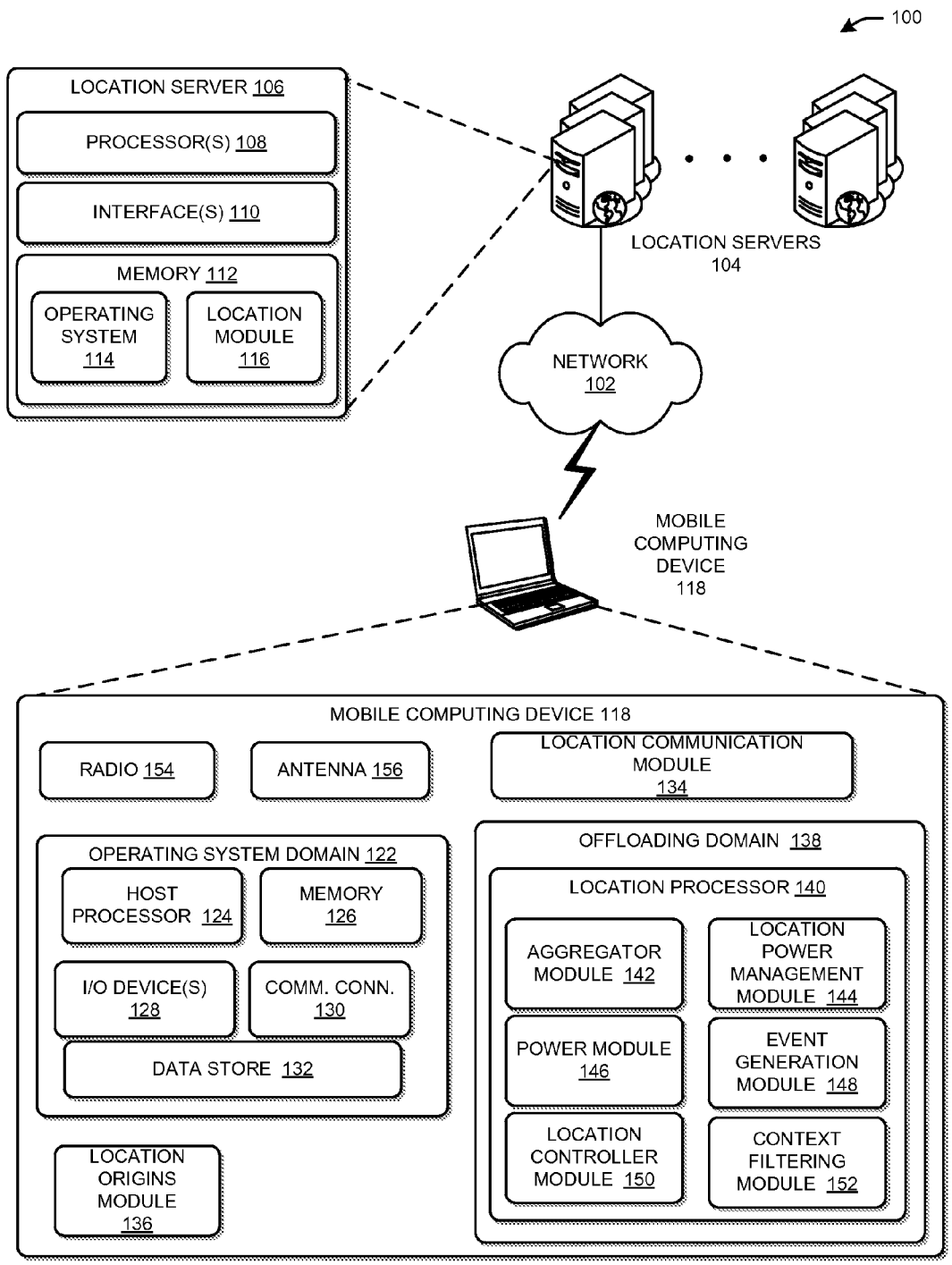
FIG. 1 is an overview of an exemplary system for offloading location-based services and functionality according to one or more embodiments of the disclosure.

Embodiments of the disclosure are described in more detail hereinafter through reference to the accompanying figures. However, other embodiments not explicitly set forth herein are also within the scope of the disclosure, and the disclosure should not be construed as being limited to only those embodiments explicitly set forth herein. Rather, the embodiments described herein are exemplary in nature and are provided so that the general scope of the disclosure is conveyed to one of ordinary skill in the art. Like reference numerals refer to like elements throughout the disclosure.

Embodiments of the disclosure provide systems, methods, and computer-readable media for offloading services and functionalities from a main host central processing unit (CPU) of a computing device to a dedicated power-efficient offload engine, thereby enabling a longer battery life for the device and an enhanced set of features. Among those services and functionalities that may be offloaded according to embodiments of the disclosure are continuous location, location-based triggering, and context aware computing services and functionalities, thereby enabling simple and efficient generation of location information based on one or more location positioning techniques or systems including, but not limited to, any current or planned Global Navigation Satellite Systems (GNSS) such as, for example, the Global Positioning System (GPS), the GLONASS System, the Compass Navigation System, the Galileo Positioning System, the Indian Regional Navigational System, or other regional navigation systems, wireless geo-location based systems including, but not limited to, a wireless wide area network (WWAN), a wireless local area network (WLAN), or a wireless personal area network (WPAN), local or remote sensor-based systems, audio or visual-based techniques and systems, server-based systems or techniques, or any other position technique or combination thereof supported by the location origin device. Some of the above-mentioned techniques utilize external information such as the locations of surrounding transmitters, access points, or satellites to calculate position/location information, while other techniques require connectivity with location databases or servers that store the location of relevant transmitters or other measurable anchors in order to enable triangulation functionality. Embodiments of the disclosure directed to the offloading of location-based services and functionalities support the efficient connectivity of the offloading entities to servers storing location information and enable the transfer of at least a portion of this information into the offloading entities.

All or a portion of the location information, location-based calculations, or location services and functionalities generally may be offloaded to a location engine including, but not limited to, mapping, navigation, landmarks (e.g., points of interest (POI)), transmitter locations, location requests, environment/context awareness, location triggered event(s) terminated at the device or at the network, web-based applications, and mobile network operator services, thereby enabling the creation of a superset of location features and a set of baseline location operating functionalities.

Exemplary embodiments of the disclosure will now be described with reference to the accompanying figures.

As used herein, the term "device" or "computing device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may facilitate optimized configuration of software as described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, distribution of software may be downloaded via the Internet.

FIG. 1 illustrates a representative environment 100 that includes a mobile computing device 118 and one or more location servers 104 in electrical communication with each over a network 102. At high level, the mobile computing device 118 may be arranged into an operating system domain 122 and an offloading domain 138. In one embodiment, the operating system domain 108 may include a variety of operational functions (e.g., processing, memory, communications) associated with a computing device. The offloading domain 138 may include additional operational functions that may be performed independently or conjunction with the operating system domain 122. In one aspect, the offloading domain 138 may perform specific functions that may not require all the capabilities provided by the operating systems domain. In this way, the offloading domain 138 may be able to perform these functions using a fewer amount of the computing device's resources or less capable resources used by the operating system domain 122. In one embodiment, the mobile computing device 118 may use the offloading domain 138 to determine the location of the mobile computing device 118 without using components in the operating system domain 122. In other embodiments, other functions performed by the mobile computing device 102 may also be included in the offload domain.

The operating system domain 122 may be implemented using hardware, software, or a combination thereof and may include a host processor 123, memory 126, input/output (I/O) devices 128, communications connections 130, a data store 132, a location communication module 134, and a location origins module 136.

The mobile computing device 118 may include one or more host processors 124 configured to communicate with one or more memory 126 devices and various other components or devices. For example, the instance mobile computing device 118 may include one or more host processors 124 that are configured to communicate with one or more memory or memory devices 126, one or more input/output (IO) devices 128, data store 132, and/or one or more communication connections 130. The host processor 124 may be implemented as appropriate in hardware, software, firmware, or combinations thereof. Software or firmware implementations of the host processor 124 may include computer-executable or machine-executable instructions written in any suitable programming language to perform the various functions described herein. The one or more host processors 124 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The mobile user device 118 may also include a chipset (not shown) for controlling communications between the one or more host processors 124 and one or more of the other components of the mobile user device 118. In certain embodiments, the mobile user device 102 may be based on an Intel® Architecture system and the host processor(s) 124 and chipset may be from a family of Intel® processors and chipsets, such as the Intel® Atom® processor family. The one or more host processors 124 may also include one or more application-specific integrated circuits (ASICs) or application-specific standard products (ASSPs) for handling specific data processing functions or tasks.

The memory 126 may store program instructions that are loadable and executable on the host processor 124, as well as data generated during the execution of these programs. Depending on the configuration and type of instant mobile computing device 118, the memory 126 may be volatile, such as random access memory (RAM), and/or non-volatile, such as read-only memory (ROM), flash memory, etc.

The memory 126 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 126 may include multiple different types of memory, such as static random access memory (SRAM), dynamic random access memory (DRAM), or ROM.

The memory 126 and the data store 132, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 130 may allow the instant offloading domain 138 to communicate with other devices, e.g., location servers 104 databases, user terminals, and various other devices that may exist on the one or more networks 102. The communication connections 130 may include a wireless system (not shown) that may enable the mobile computing device 118 to communicate wirelessly with the other devices over the network 102. The wireless system may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system may include a transmitter and a receiver or a transceiver (not shown) capable of operating in a broad range of operating frequencies governed by the IEEE 802.11 wireless standards.

The IO devices 128 may enable a user to interact with the instance host device mobile computer device 118 Such I/O devices may include, but are not limited to, a keyboard, a mouse, a pen, a voice input device, a touch input device, a display, a camera or imaging device, speakers, or a printer.

The one or more data stores 132 may store lists, arrays, databases, flat files, etc. In some implementations, the data store 132 may be stored in memory external to the mobile computer device 118 but accessible via the one or more networks 102, such as with a cloud storage service. The data stores 132 may store resource parameters. In one embodiment, each instance may have a data store 132 that stores resource parameters associated with the instance.

The mobile computing device 118 may also include a location communication module 134 and a location origins module 136. In this embodiment, both modules are illustrated as distinct entities within the operating system domain 122. However, one or more or all portions of the modules may use or be incorporated into the memory 114 in certain embodiments.

The location communication module 134 may support a variety of flexible location-based services, and in the case of location-based mobile services, may extend the location Application Programming Interface (API) to provide for connectivity to the location servers 104 via network 102, which may generally be referred to as a communications cloud. The location communication module 134 will be described in greater detail in the discussion of FIG. 2.

The location origins module 136 may receive positioning information from the locations server 104 or other location information devices that provide a location associated with the mobile computing device 118 or location information that may be used to determine the location of the mobile computing device. The location origins module 136 may comprise (not shown in FIG. 1), for example, a Wi-Fi modem, a cellular modem, one or more location sensors, a Global Navigation Satellite Systems receiver, a Bluetooth® modem, or a Near Field Communication (NFC) device. While specific location origin devices have been described, any other suitable location origin device capable of receiving location information may be provided. The location origins module 136 will be discussed in greater details in the discussion of FIG. 2. In another embodiment, the location origins module 136 may be included in the offloading domain 138 instead of the operating system domain 108.

Turning to the offloading domain 138 which, some embodiments, may implement location determination and power management functionality for the mobile computing device 118. In one embodiment, the offloading domain 138 may operate independently of the operating system domain 122, in that the offloading domain 138 may not use the all or a majority of the components in the operating system domain 122. In another embodiment, the offloading domain 138 may operate in conjunction with one or more components of the operating system domain 122. For example, the offloading domain 138 may use the location processor 140 to determine the location of the mobile computing device 118 instead of using the host processor 124 in the operating system domain 122. In this instance, the location processor 140 may be a processor that consumes less power than the host processor 124. For example, the location processor 140 may include one or more application-specific integrated circuits (ASICs) or application-specific standard products (ASSPs) for handling specific data processing functions or tasks.

In one embodiment, the location processor 140 may comprise one or more controllers (described in more detail hereinafter) that interact with one another as well as potentially other components to generate an efficient, low-power execution environment that is tasked with performing location offloading activities that would otherwise be performed by the location communication's module 134 or the host processor 124 operating within the operating system domain 122.

Figure 2:
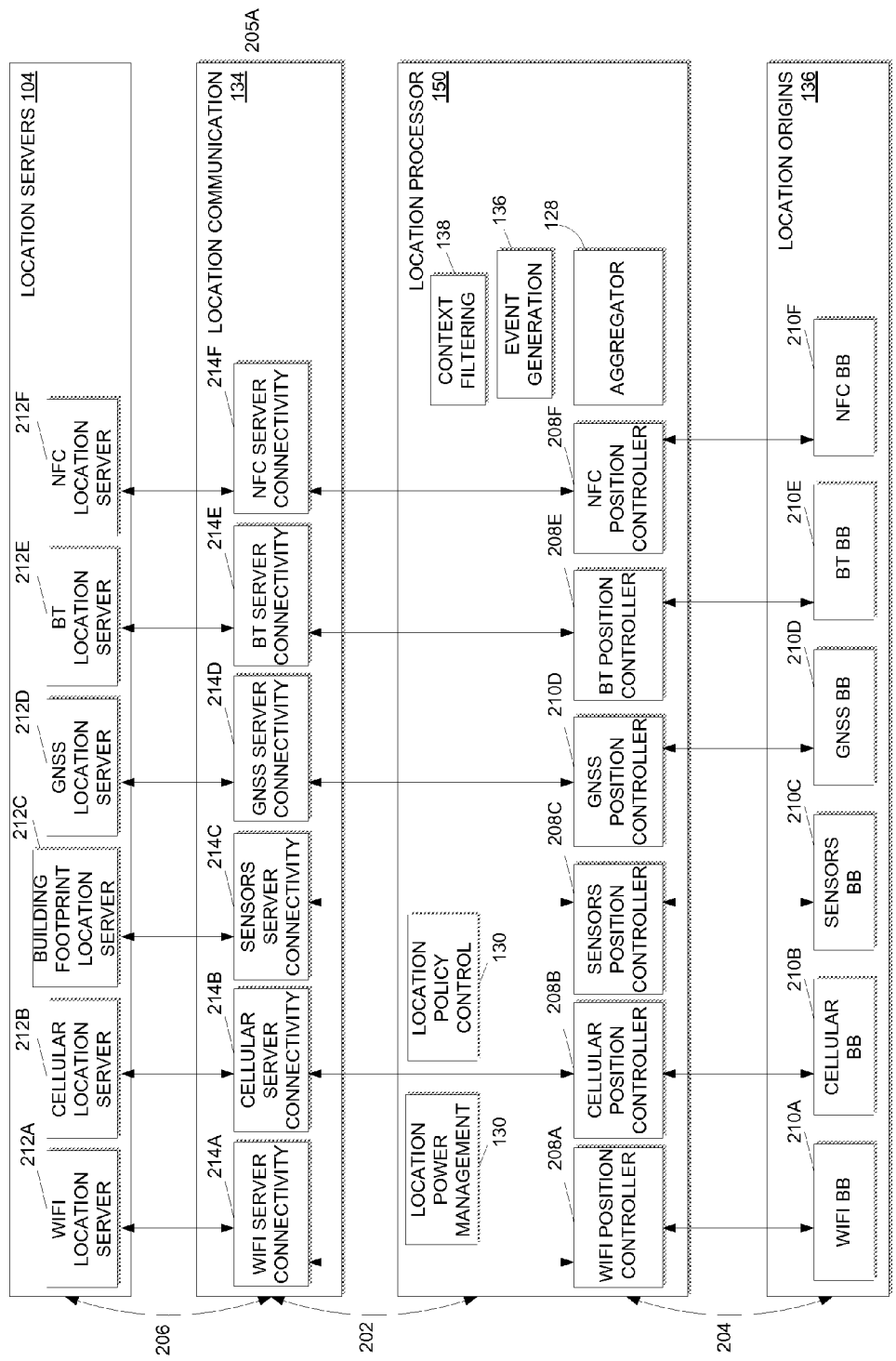
FIG. 2 is a block diagram depicting components of an exemplary system for offloading location-based services and functionality according to one or more embodiments of the disclosure.

The offloading domain 138 may also include an aggregator module 142, a location power management module 144, a power module 146, a location controller module 150, an event generation 148, and a context filtering module 152 which will all be discussed in greater detail in the discussion of FIG. 2.

With further references to the mobile computing device 118, it may further include one or more radios 154 and one or more antennae 156. The radio 154 may transmit and receive radio signals. The radio 154 may include a communication interface to facilitate communication between the location communications module 134 and the received radio frequency signals. In one example, radio frequency (RF) signals may be received by the antenna 156. In an exemplary embodiment of the present disclosure, the one or more antennae 156 may be wideband antennae operable over a wide frequency range, perhaps from several megahertz (MHz) to the multi-gigahertz (GHz) range. The input signals received by the antennae 156 may be passed or otherwise provided to an analog or digital module within the radio 154, such as a convertor or a decoder (not shown). Further, these input signals may be transmitted to either the operating system domain 122, through the locations communication module 122 or the offloading domain 138. In some embodiments, the radio 154 may receive location information from one or more location servers 106

The locations servers 106 may provide location information to the mobile computing device 118. With regard to FIG. 1 they are described generically and will be discussed in greater detail in the description of FIG. 2. In general terms, the location server 104 may include a processor 108, one or more interfaces 110, and memory 112.

The processor 108 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processor may execute computer-readable instructions stored in memory 112 or instructions provided over the network 102.

The one or more interfaces 110 may include, but are not limited to, a keyboard, a mouse, a pen, a voice input device, a touch input device, a display, a camera or imaging device, speakers, or a printer. The interfaces 110 may also include network communication hardware and/or software to send and receive information over the network 102.

The memory 112 may include, but is not limited to, an operating system 114 and a location module 116. The operating system 114 may include computer-readable instructions that are executed by the processor 108 to implement a variety of tasks. For example, the tasks may include, but are not limited to, operating the components of the interface module 110.

The location module 116 may any or all hardware, software, or a combination thereof to collect, analyze, and provide location information to the mobile computing device 118. This location module (also known as location framework module) 116 is merely an indication of the component needed to implement a variety of location detection techniques that may be used by the mobile computing device 118. For example, the location module (also known as location framework module) 116 may include any and all needed hardware or software to implement detection techniques using a WWI-FI network, a cellular network, a building footprint database, a global positioning satellite network, a short-range wireless network such as a BLUETOOTH network, or any other near field communication network.

FIG. 2 depicts the connectivity, according to one or more embodiments of the disclosure, between various components of the exemplary system 200 depicted in FIG. 1. The system 200 includes a logical and/or physical separation between various components of the system including the location servers 104, the location communications module 134, the location processor 140, and the location origin module 136. The various components may be linked by various Application Programming Interfaces (APIs). For example, the location communication module 134 may include 205A and the location processor 140 may communicate with each other via a location offloading application programming interface (API) 202. Further, the location processor 140 and the location origins module 136 may communicate with each other via a location origins API 204. Moreover, the location communications module 134 may communicate with the location servers 104 via link 206 which may be any suitable wired and/or wireless communication link.

The location processor 140 may comprise one or more position controllers 208A-208F. The position controllers 208A-208F may comprise, but are not limited to, a Wi-Fi position controller 208A, a cellular position controller 208B, a sensors position controller 208C, a GNSS position controller 208D, a short-range wireless position controller 208E, or an NFC position controller 208F. The WI-FI position controller 208A is used herein for exemplary purposes to describe the connectivity between the various components of the system 200. However, it should be noted that the discussion with respect to any particular sub-component is generally applicable to other sub-components as well.

The one or more position controllers 208A-208F of the location processor 140 interact with the location origins module 136 that may include location origin devices 210A-210F and potentially the location servers 104 (via the location communications module 134) to perform the offloaded location calculations and generate location events and context events based on measurements provided by the location origin devices. As an example, WI-FI position controller 208A obtains location measurements from the Wi-Fi location origin device 210A. The WI-FI position controller 208A may also obtain location-based information from WI-FI location server 212A via WI-FI server connectivity 214A established through the location framework module 116. Based on the location measurements received from the WI-FI location origin device 210A and potentially additional location-based information received from WI-FI Location server 212A, WI-FI position controller 208A may perform location calculations, generate location events and context events, and report the results of the calculations. The discussion above with respect to the Wi-Fi position controller 208A is generally applicable to other position controllers that obtain location measurements from other location origin devices (e.g. cellular modem 210B, GNSS receiver 210D, etc.).

Functionalities provided by the location processor 140 include, but are not limited to, determination of basic location information (i.e. spatial location coordinates as a function of time) and related information (e.g. satellite information, WI-FI AP information, cell tower information, etc.), event triggering based on location data, initiation and processing of internal and external flows of location dependent host activities, location engine power management for local components, management of location origin devices and sensors, location fusion/arbitration logic, location data buffering, time stamping and location history generation, context framework generation, privacy management, emergency services support, or support for Independent Software Vendor (ISV) value-added location based functionalities.

In certain embodiments, the location processor 140 may interact with other offload engines or entities including, but not limited to, communication management entities, sensor management entities, security engines, event generation entities, context awareness entities, augmentation reality entities, and so forth. The location processor 140 may support access to these other offload entities regardless of a state of the main host and/or OS (e.g. active state, standby state, sleep state, etc.) and according to a configurable policy. The active state may indicate that the host processor 124 (not shown) may be using more power than in a standby state. The standby state may indicate that the host processor (124) may be using less power than the active state and the sleep state may use less power than the standby state.

In accordance with one or more embodiments of the disclosure, the location processor 140 may be configured to communicate with the location origin devices 210A-210F and calculate position based on measurements provided by the location origin devices 210A-210F regardless of the state of the host processor 124. Exemplary host states include an active state (e.g. when host navigation software is running), a sleep state (e.g. position logging and geo-fencing), or a connected standby state (e.g. supporting device location sharing). When communicating with the location origin devices 210A-210F while the host is in a sleep state, the location processor 140 can interact with the location origin devices 210A-210F directly or indirectly, over a physical interface and/or logical channels without the need for active host support, in other words, in an offloaded manner. More specifically, as touched upon earlier, the location engine 126 may comprise one or more position controllers, with each position controller responsible for controlling or configuring a particular location origin device (e.g. cellular modem 210B, GNSS receiver 210D, WI-FI modem 210A, short-range wireless radio B modem (BLUETOOTH® modem) 210E, Sensors 210C, a NFC device 210F, Audio, Video, etc.), collecting the relevant location measurement data from the device, and sending to the location origin device the relevant location assistance information. In one or more alternative embodiments, a central position controller (not shown) may be provided that controls a plurality of location origin devices 210A-210F. In various embodiments, the central controller or the one or more dedicated controllers 208A-2108F, whichever the case may be, are also responsible for maintaining the local offloading database and/or initiating database update flow in the case where the location processor 140 needs some location assistance or location database information (e.g. list of surrounding transmitters).

In accordance with one or more embodiments of the disclosure, each position controller may control a separate location calculator (not shown) that calculates location information based on information received from a particular location origin device. In alternative embodiments, a central position controller or a plurality of dedicated position controllers 208A-208F may control a single location calculator to perform location calculations based on information received from all or some subset of the location origin devices 210A-210F. A position aggregator/concentrator 128 may be provided that aggregates the location calculations that are performed by each of the location calculators based on information received from a corresponding location origin devices 210A-210F. The position aggregator/concentrator 142 may then select a particular location calculation based on a known performance indicator. In certain embodiments, the position aggregator/concentrator 142 may perform a weighted location calculation based on the location calculations received from the various location calculators. In other embodiments, the measurement data may be received directly from the origin devices 210A-210F, from corresponding position controllers 208A-208F, or from a central position controller and the position aggregator/concentrator 142 may perform the necessary location calculation(s).

The location processor 140 may also comprise location policy control and location power management functionality via the location power management module 144 that is operative to enforce the location power save and location origins connectivity and modes of operation. An exemplary location policy may relate to availability of location measurements, the cost function (e.g. power) of extracting the location measurements, and/or the required level of service (e.g. accuracy, time-to-fix, power budget or any other service parameters). The location policy control and location power management functionality may be provided by software modules, hardware components such as one or more controllers and/or processors, and/or a combination thereof. The location power management module 144 may also control access to the location servers by upper layers such as, for example, by location communications module 134. For instance, under restricted power budget profiles, these modules will enforce the use of local database(s) rather than allowing access to the location servers 212A-212F. The location servers may include a Wi-Fi location server 212A, a cellular location server 212B, a building footprint location server 212C, a GNSS location server 212D, a short-range wireless (BLUETOOTH®) location server 212E, and NFC server 212F.

The location power management module 144 may also receive power level information for the mobile computing device 118 from the power module 146. Power level information may include whether or not the mobile computing device 118 is currently plugged in or is using batter power. Further, the power level information may identify the amount of battery power available on the device prior to recharging. The power module 146 may determine the remaining power level for the mobile computing device 118. The power module 146 may also control the allocation of power to other components of the mobile computing device 118. In certain instances, the power module 146 may implement the power control or allocation based at least in part on the policy or protocol decisions made by the location power management module 144.

Referring again to the location calculation, once the location is calculated, the calculated location may be either stored or forwarded to the location communications module 134. Prior to forwarding the calculated location to the location communications module 134, the location calculation may undergo context filtering (e.g. identifying points of interest (POI) within a certain vicinity of the calculated location, identifying a specific time interval to associate with the calculated location, etc.). If the host processor 124 is in a sleep state, the location processor 140 may wake the host processor 124 when certain context conditions are met. More specifically, the event generation module 148 and context filtering module 152 enable continuous location acquisition when the host processor 124 is in a sleep state. The event generation module 148 entity may generate an event based on the calculated location received from the position aggregator/concentrator 142 and the context filtering module 152 may generate the context event and decide to wake the host when certain conditions are met such as, for example, when a certain point of interest is reached. The event generation module 148 and context filtering module 152 may be configured from the host processor 124.

Current location services require the host processor 124 to be in an active state. As such, embodiments of the disclosure provide distinct advantages over conventional solutions including, but not limited to, power-efficient location offloading, cost effective location calculation based on multiple location origin devices, offloading of location assistance information to location servers and efficient connectivity to the location servers 104, environment/context awareness, and reduced power consumption and increased battery life. As described earlier, these advantages and other advantages are achieved by splitting the location functionalities between the location processor 140, which provides a multi-purpose low power location execution environment responsible for all location offloading activities, and the location communications module 134, which enables flexible Location Based services and extends the range of location APIs 202, 204, 206 to improve and enrich the user experience.

Figure 3:
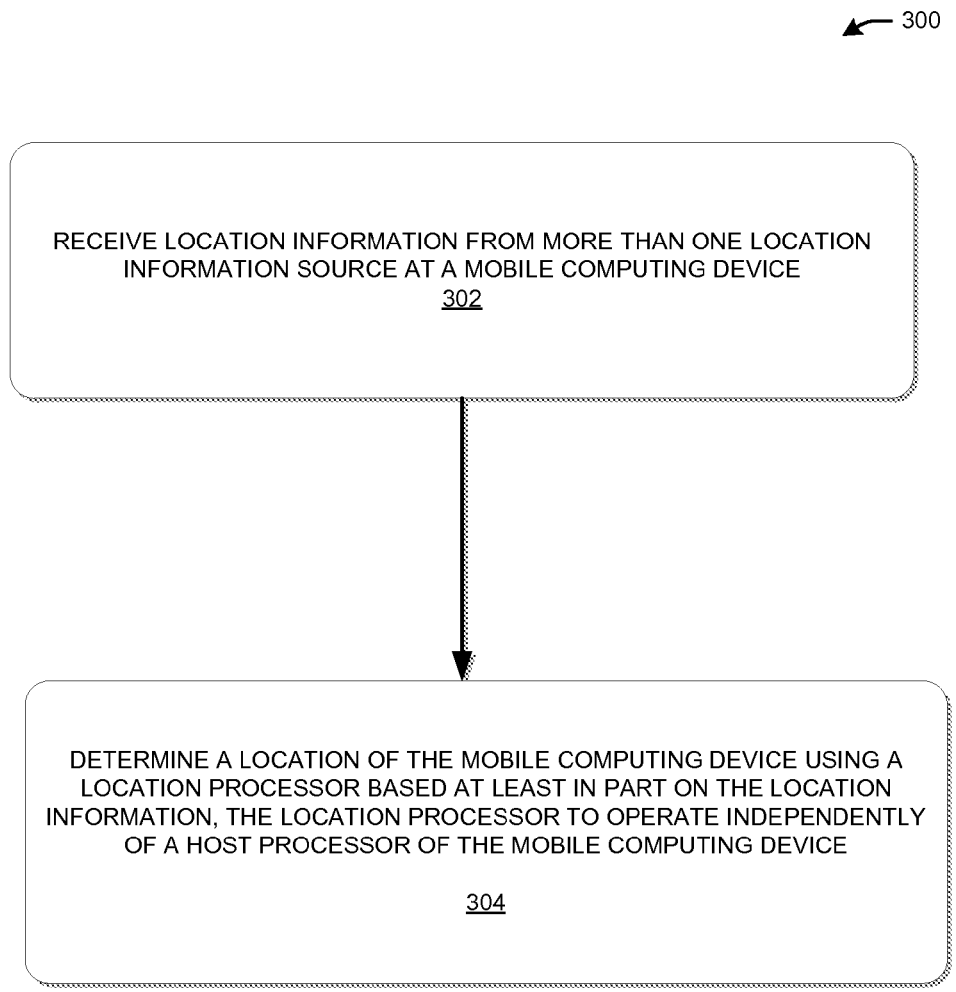
FIG. 3. is a flow chart illustrating one method implemented by using one or more components of the system described in FIG. 1 in accordance with one or more embodiments of the disclosure.

Referring now to FIG. 3, a flow diagram is depicted to describe an example embodiment of the method 300 for using the offload domain 138 within the context of location determination for the mobile computing device 118. It should be noted, that the method 300 may be modified in various ways in accordance with certain embodiments. For example, one or more operations of the method 300 may be eliminated or executed out of order in other embodiments.

At block 302, the mobile computing device 118 may receive location information from more than one location information source. For example, the Wi-Fi position controller 208A may receive information from the Wi-Fi location server 212A or the Wi-Fi location origin device 210A. The information may include wireless signals from more than one Wi-Fi location origin device 210A (e.g., access points) that the mobile computing device 118 may use to determine its location. In another embodiment, the location information provided from the Wi-Fi devices may also include an authenticated scan list. The authenticated scan list may also be used to determine the location of the mobile computing device 118. Similarly, the other location origin devices 210B-210E and/or location servers 212B-212F may also provide location information associated with the mobile computing device.

At block 304, the mobile computing device 118 may use the location processor 140 to determine a location of the mobile computing device 118 using the information provided from the location information sources (e.g., 210A-210F or 212A-212F). In this embodiment, the location processor 140 may calculate the location of the mobile computing device 118 without using the host processor 124 from the operating system domain 122. The location processor 140 may be a low power processor or ASIC or ASSP that can perform the location calculations without using the host processor 124 that consume power at a higher rate than the location processor 140. The location processor 140 may be enabled to process any information provided by the location origin devices 210A-210E and/or location servers 212A-212F. In one embodiment, the position controllers 208A-208F may receive the location information and calculate the location of the mobile computing device 118. The aggregator module 142 may aggregate the location determinations and determine which location is ranked the highest based at least in part on one or more performance indicators.

Figure 4:
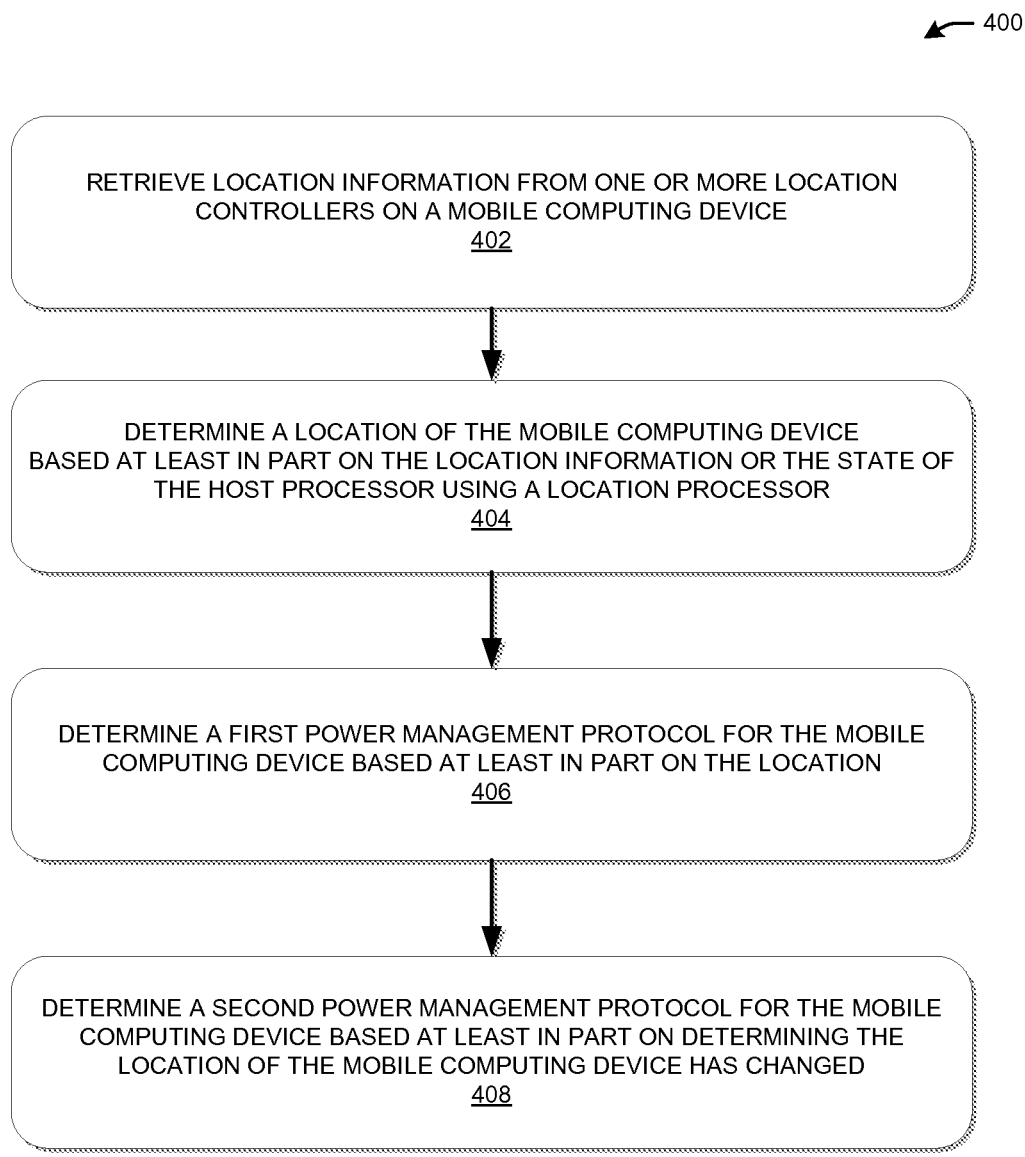
FIG. 4. is a flow chart illustrating one method implemented by using one or more components of the system described in FIG. 1 in accordance with one or more embodiments of the disclosure.

FIG. 4 includes a flow diagram of exemplary method 400 using the offload domain 138 within the context of location-based power management control for the mobile computing device 118. It should be noted, that the method 400 may be modified in various ways in accordance with certain embodiments. For example, one or more operations of the method 400 may be eliminated or executed out of order in other embodiments.

At block 402, the aggregator module 142 may retrieve the location information from the one or more position controllers 208A-208F. In one embodiment, the location information may include the calculated locations based on the information from the location origin devices 210A-210F. In another embodiment, the location information from the location origin devices 210A-210F may be passed on to the aggregator module 142 that may also determine or calculate the location of the mobile computing device 118 based at least in part the retrieved location information.

At block 404, the aggregator module 142 may determine which location is the optimal location for the mobile computing device 118 based at least in part on a Performance Indicator or a preference of the user. For example, the user may select which location information sources are preferred to be used over other locations sources. In one instance, the user may prefer GPS location data; therefore the aggregator will determine the GPS location as the optimal location. However, if the GPS location is not available, the location processor 140 may select the next preferred source or rely on the Key Performance Indicator. For example, a Key Performance Indicator may include signal strength or any other indicator that points to better accuracy or reliability of the location information.

At block 406, the location power management module 144 may use the optimal location determined by the aggregator module 142 to determine or select a first power management protocol that is configured to be used when the mobile computing device 118 is located at a particular location. In another embodiment, the power management protocol may also be based on the amount of remaining power that is available to the mobile computing device 118 in addition to the determined location. For example, the first power management protocol may dictate that the host processor 124 be placed in a standby state whenever the mobile computing device is outside. In another embodiment, the power management protocol may dictate one or more of the components of the mobile computing device 118 are placed in a low power mode when the device is at a specific location.

At block 408, the location power management module 144 may select a second power management protocol based at least in part on the location processor 140 determining that the mobile computing device has changed to a different location than the one described in block 406. In this way, the power management protocols may be actively changed based on the location whenever a new location is determined. For example, in block 404, the host processor 124 may have been placed in a standby state when the mobile computing device 118 was determined to be outside. However, when the mobile computing device 118 was determined to be inside a building, the location power management module 144 may determine to implement a second power management protocol that places the host processor in an active state. In this instance, the active state may consume more power than the standby state. Accordingly, the mobile computing device 118 may use less power when located outside of a building than when the device 118 is located inside a building.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments of the disclosure have been described herein. The features, aspects, and embodiments are susceptible to combination with one another as well as to variation and modification, as will be understood by one of ordinary skill in the art. The present disclosure should, therefore, be considered to encompass any such combinations, variations, and modifications.

The terms and expressions used herein to describe various embodiments of the disclosure are intended as terms of description and not of limitation. The use of such terms and expressions is not intended to exclude any equivalents of the features shown and described (or portions thereof), and it is recognized that various modifications are possible and within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but is intended to cover various modifications and equivalent arrangements, and such modifications and arrangements are within the scope of the claims. Although specific terms are employed herein, they are used in a descriptive sense only, and not for purposes of limitation.

This disclosure uses examples to disclose certain embodiments of the disclosure, including the best mode, and also to enable any person skilled in the art to practice certain embodiments of the disclosure, including making and using any devices or systems and performing any methods disclosed herein. The patentable scope of the disclosure is defined by the claims, and may include other examples not specifically disclosed herein and which may occur to those skilled in the art. Such other examples are within the scope of the claims if they have structural elements that do not differ from the literal language of the claims, or if they include equivalent structural elements with insubstantial differences from the literal language of the claims.

The invention claimed is:
1. A mobile computing device comprising:
a host processor configured to execute computer-readable instructions stored on the mobile computing device, the host processor having a first state, wherein the first state is based at least in part on a power consumption of the host processor, and wherein the first state is one of an active state or an inactive state;
a location communications module configured to receive location information associated with the mobile computing device from one or more location information sources; and
a location processor configured to manage a transition of the host processor from the first state to a second state, the location processor comprising:
a position aggregator module stored on non-transitory computer-readable media that when executed by the location processor cause the location processor to aggregate the location information received from the one or more location information sources and determine a position associated with the mobile computing device based at least in part on the location information and at least one performance indicator;
an event generation module stored on non-transitory computer-readable media that when executed by the location processor cause the location processor to continuously receive the position determined by the position aggregator unit and identify one or more context events based at least in part on the position; and
a context filtering module stored on non-transitory computer-readable media that when executed by the location processor cause the location processor to facilitate the transition of the host processor from the first state to the second state based at least in part on the one or more context events.

2. The mobile computing device of claim 1, wherein the one or more power reduction guidelines comprise at least one of:
availability of the location information;
a power consumption associated with receiving the location information; or
a required level of service comprising location accuracy, a power budget or an amount of time to process the location information.

3. The mobile computing device of claim 1, wherein the one or more context events comprise arriving at a point of interest.

4. The mobile computing device of claim 1, further comprising one or more antennae in communication with a radio, wherein the location information received by the radio from the one or more antennae is processed by the location communications module.

5. The mobile computing device of claim 1, wherein the host processor consumes more power in the active state than the location processor.

6. The mobile computing device of claim 1, wherein the host processor in the standby state or the sleep state consumes less power than the host processor in the active state.

7. The mobile computing device of claim 1, wherein the inactive state comprises at least one of the following: i) a sleep state; or ii) a standby state.

8. The mobile computing device of claim 7, wherein the location processor is configured to continuously receive the location information from one or more location sources while the host processor is in the sleep state and is further configured to identify a plurality of points of interest based at least in part on the location information.

9. The mobile computing device of claim 7 wherein the location processor is configured to support device location information sharing while the host processor is in the standby state.

10. A method comprising:
receiving, by a location processor of a mobile computing device, location information from one or more remote location information sources, wherein the mobile computing device further comprises a host processor that operates independently of the location processor;
aggregating a respective portion of the location information received from each of the one or more remote location information sources to obtain aggregated location information;
determining, by the location processor, a position of the mobile computing device based at least in part on the aggregated location information and a performance indicator; and
determining a state for the host processor based at least in part on the position, wherein the state is an active state or an inactive state.

11. The method of claim 10, wherein operation of the location processor consumes less power than operation of the host processor in the active state.

12. The method of claim 10, wherein the one or more remote location information sources comprise one or more of:
a global positioning satellite network;
a wireless local area network;
a personal local area network;
cellular network; or
a near field communication network.

13. The method of claim 10, where the inactive state of the host processor comprises one of the following: i) a standby state that uses less power than the active state, or ii) a sleep state that uses less power than the standby state.

14. One or more non-transitory computer readable media storing computer-readable instructions that responsive to execution by a location processor of a mobile device configure the location processor to:
receive location information associated with one or more remote location information sources, wherein the mobile device further comprises a host processor configured to operate independently of the location processor;
aggregate a respective portion of the location information received from each of the one or more remote location information sources to obtain aggregated location information;
determine a position of the mobile device based at least in part on the aggregated location information and a performance indicator; and
determine a power consumption state for the host processor based at least in part on the position.

15. A method comprising:
retrieving, by a mobile device comprising a host processor and a location processor, location information from one or more location sources, wherein the host processor is configured to operate independently of the location processor;
aggregating a respective portion of the location information received from each of the one or more location sources to obtain aggregated location information;
determining, from the aggregated location information, a first optimal location of the mobile device based at least in part on a performance indicator;
determining, by the location processor, a first power management protocol for the mobile device based at least in part on the first optimal location;
determining, from the aggregated location information, a second optimal location of the mobile device; and determining, by the location processor, a second power management protocol for the mobile device based at least in part on the second optimal location.

16. The method of claim 15 wherein at least one of the first power management protocol or second power management protocol reduces power consumption based at least in part on a power allocation between one or more components of the mobile device.

17. The method of claim 15, wherein at least one of the first power management protocol or second power management protocol is further based at least in part on a power consumption associated with the mobile device.

18. The method of claim 15, wherein the location information comprises one or more of:
 a global positioning satellite data;
 a wireless local area network data;
 a personal local area network data;
 a cellular network data; or
 a near field communication network data.

19. One or more non-transitory computer readable media comprising computer executable instructions that responsive to execution by a location processor of a mobile device configure the location processor to perform a method comprising:
 retrieving location information from one or more location sources, wherein the mobile device further comprises a host processor that is configured to operate independently of the location processor;
 aggregating a respective portion of the location information received from each of the one or more location sources to obtain aggregated location information;
 determining, from the aggregated location information, a first optimal location of the mobile device based at least in part on a performance indicator;
 determining, by the location processor, a position associated the mobile device based at least in part on the location information;
 determining a first power management protocol for the mobile device based at least in part on the first optimal location;
 determining, from the aggregated location information, a second optimal location of the mobile device; and
 determining a second power management protocol for the mobile device based at least in part on the second optimal location.

20. The one or more computer readable media of claim 19, wherein at least one of the first power management protocol or second power management protocol reduces power consumption by allocating power between one or more components of the mobile device.

21. The one or more computer readable medium of claim 19, wherein at least one of the first power management protocol or second power management protocol is based at least in part on a power level associated with the mobile device.

22. The one or more computer readable medium of claim 19, wherein the one or more location sources comprise one or more of:
 a global positioning satellite data;
 a wireless local area network data;
 a personal local area network data;
 a cellular network data; or
 a near field communication network data.

* * * * *